Nov. 25, 1952
R. H. HUNTER
2,619,122
FLOW REGULATOR AND FLOAT VALVE ASSEMBLY
Filed Feb. 20, 1947
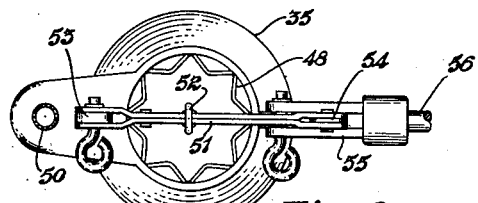
Fig. 2
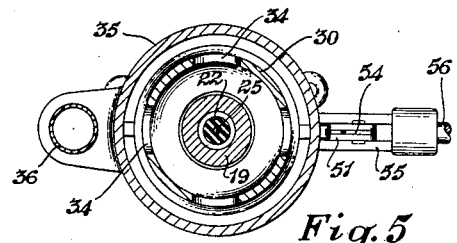
Fig. 5
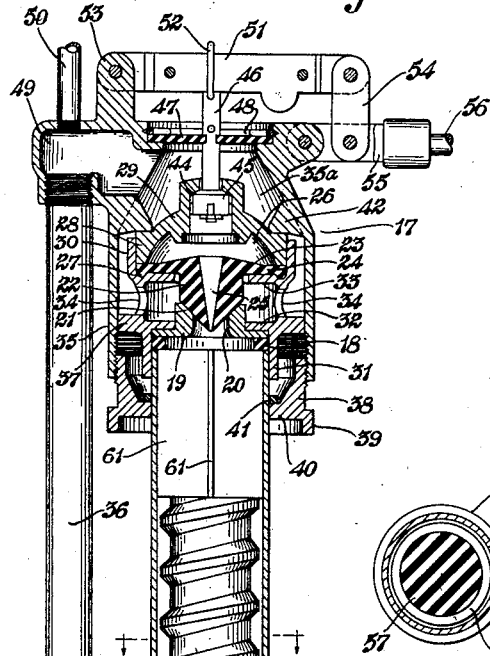
Fig. 1
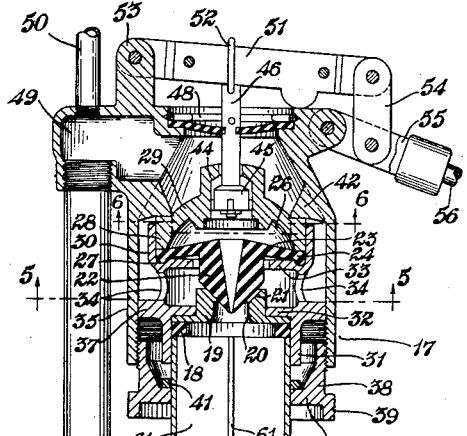
Fig. 4
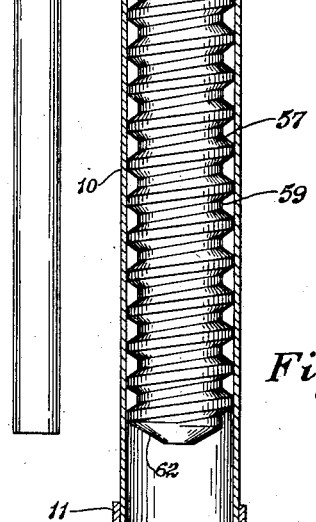
Fig. 3
Fig. 6
Inventor
Rutherford H. Hunter
By
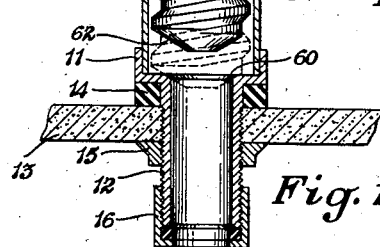
Attorneys Patented Nov. 25, 1952

2,619,122

UNITED STATES PATENT OFFICE 2,619,122

FLOW REGULATOR AND FLOAT VALVE ASSEMBLY

Rutherford H. Hunter, Wooster, Ohio

Application February 20, 1947, Serial No. 729,721

3 Claims. (Cl. 137—711)

1

The invention relates generally to a device for controlling the flow of water into a water closet flush tank, and more particularly to a float valve and flow regulator assembly for feeding water quietly into the tank at a substantially uniform rate regardless of variations in supply pressure. This application embodies improvements over the constructions disclosed in my co-pending application, Serial No. 704,774, filed October 21, 1946, and entitled Flow Regulator, now Patent No. 2,506,152, dated May 2, 1950.

It is an object of the present invention to provide a novel float valve assembly having means for regulating the flow of water through the valve.

Another object is to provide a novel float valve assembly having novel flow regulating means in the water inlet tube leading to the valve.

Another object is to provide a novel float valve assembly having novel flow regulating means which is simple and inexpensive to manufacture, and has no working parts to get out of order and repair.

A further object is to provide a novel float valve assembly having an improved flow regulator which renders the float valve assembly practicable for universal use with widely different water supply pressures.

Another object is to provide a novel float valve assembly which is quiet and efficient in operation with substantially no vibration or water hammer.

A further object is to provide a novel float valve assembly which is simple and inexpensive to manufacture.

A still further object is to provide a novel float valve and flow regulator assembly which is quickly and easily assembled and installed in, or disassembled and removed from a water closet flush tank, in a minimum amount of time and without tools.

These and other objects are accomplished by the parts, constructions, arrangements and combinations which comprise the present invention, the nature of which is set forth in the following general statement and a preferred embodiment of which is set forth in the following description and illustrated in the accompanying drawing, and which is particularly and distinctly pointed out and set forth in the appended claims forming part hereof.

In general terms, the float valve and flow regulator assembly of the present invention includes an inlet tube supporting the valve assembly at its upper end, a resilient flow regulating element in said tube distortable by fluid pressure for maintaining a constant flow therethrough, and said valve assembly having separate interfitting parts held together in operating position by a clamping nut on said inlet tube.

Referring to the accompanying drawing in which a preferred embodiment of the present invention is shown by way of example:

Figure 1 is a vertical sectional view of a flow regulator and float valve assembly embodying my invention;

Fig. 2 is a plan view thereof;

Fig. 3 is a fragmentary plan sectional view as on line 3—3, Fig. 1;

Fig. 4 is a view similar to Fig. 1 showing the valve in open position and the regulator compressed by relatively high supply pressure;

Fig. 5 is a cross sectional view as on line 5—5, Fig. 4; and

Fig. 6 is a fragmentary cross sectional view as on line 6—6, Fig. 4.

Similar numerals refer to similar parts throughout the several views of the drawing.

The novel float valve assembly preferably includes an inlet pipe or tube 10 secured at its lower end in a socket 11 formed on the upper end of a threaded connector 12 which extends through an opening in the bottom wall 13 of a water closet flush tank. A suitable washer 14 of rubber and the like is interposed between the socket 11 and the tank wall 13, and a clamping nut 15 may be screwed on the connector 12 for abutting the lower surface of the tank wall 13. The lower end of the connector 12 may be provided with a cap 16 during shipment and storage, and is connected with a water supply pipe in a usual manner when installed in the tank.

The inlet tube 10 is preferably somewhat enlarged in diameter with respect to the bore of the connector 12, for a purpose to be described, and the float valve assembly indicated generally at 17 is supported on the upper end of the inlet tube. Preferably, the float valve assembly 17 is supported on a rubber gasket 18 which rests on the upper end of the inlet tube 10.

The gasket 18 carries the outer annular flange of a valve seat member 19 having an axial inlet passage 20, and the upper end of the member 19 is provided with an annular seat 21 which is preferably inwardly tapered or conical. The enlarged central body portion 22 of a diaphragm valve 23 is adapted to fit on the seat 21 and close the inlet passage 20. The diaphragm valve 23 is constructed of soft resilient rubber and preferably has an annular rim portion 24 extending radially outward from the upper end of the body portion 22. The body portion 22 has a small conical aperture 25 extending vertically therethrough with its large end uppermost, and this aperture permits a small amount of water to flow through the diaphragm valve when it is closed and into the pressure chamber 26 located above the valve.

The outer rim of the flange 24 of the valve is provided on its underside with a depending rib 27 and is engaged on its upper surface by the bottom end 28 of a dome-shaped pilot valve member 29 which forms the pressure chamber 26.

The lower end 28 of the dome-shaped member 29 telescopes within the upper end of an inner housing member 30, the bottom end 31 of which is a socket which telescopes over the upper end of the inlet tube 10 and as well as over the gasket 18 and the rim of the valve seat member 19. The housing 30 is provided with a lower internal annular flange 32 which abuts the upper surface of the rim of valve seat member 19, and with an upper internal flange 33 which supports the rim flange 24 of the valve 22 and has an annular groove into which the rib 27 of the valve fits. Between the flanges 32 and 33, the valve housing 30 is provided with discharge apertures 34 which allow water flowing through the valve inlet 20 to discharge radially through the valve housing 30 when the valve is open.

As shown, the inner valve housing 30 is enclosed in an outer valve casing 35 which carries the float rod linkage at its upper end and conducts the water discharging from the openings 34 to a depending fill pipe 36. The casing 35 fits tightly around the annular flange 37 of the inner housing and is provided at its lower end with internal screw threads into which a hand nut 38 is screwed for assembling the valve parts on the top end of the inlet tube 10. As shown, the hand nut 38 preferably has an exterior knurled surface 39 for gripping with the fingers and an interior annular shoulder 40 which is slidable on the inlet tube 10 and which abuts the undersurface of a collar 41 secured to the inlet tube.

The upper end of the exterior valve casing 35 is preferably tapered inwardly and has a pair of diametrically opposed inwardly extending clamping lugs 42 which engage the upper surface of the rim 28 of the dome-shaped member 29. Accordingly, when the parts are assembled in the manner shown in Figs. 1 and 4, as the nut 38 is screwed upwardly it draws the outer casing 35 and inlet tube 10 together, and clamps the seat member 19 against the gasket 18 and the rib 27 of the diaphragm valve between the groove in the valve housing and the dome shaped member 29. Thus, the parts are quickly assembled and then clamped in position by the hand nut 38 without requiring the use of tools. If for any reason it is desired to disassemble the valve 17, the same is easily accomplished by unscrewing the nut 38, whereupon all of the parts of the valve assembly are quickly removed.

The upper end of the dome-shaped member 29 has a pilot valve seat 44 therein, and is adapted to receive the head 45 of a pilot valve having an upwardly extending stem 46. The pilot valve controls the discharge of water from the pressure chamber 26 into a chamber 35a formed in the upper end of the outer valve casing 35. The pilot valve stem 46 extends upwardly through chamber 35a and a diaphragm partition 47 closes the upper end of the valve casing while permitting limited movement of the stem. The diaphragm partition 47 is preferably held in position at its outer rim by a closure wire snap retaining ring 48 which is sprung into a retaining groove in the upper end of the valve casing 35.

At one side the upper end of chamber 35a communicates with a side chamber 49, and the depending fill pipe 36 is screwed into the bottom of said chamber and communicates therewith. A small refill pipe 50 is preferably screwed into the top of said chamber and communicates therewith for conducting a small amount of water to the toilet bowl when the tank is filling, in a usual manner.

The upper end of the pilot valve stem 46 is loosely connected with a lever arm 51 by means of a wire loop 52, and the lever arm is pivotally connected at one end to an ear 53 on the upper end of the casing 35 and is pivotally connected at its other end to a link 54. The link 54 is connected at its bottom end to a yoke arm 55 which is attached to the float rod 56. The float rod 56 has the usual float (not shown) attached to its outer end for rising and falling with the water level in the flush tank.

In the normal operation of the float valve, when the water in the tank has been discharged so that the float rod 56 drops to the position of Fig. 4, the pilot valve 45 is moved downwardly from the seat 44 to allow water to flow from the pressure chamber 26 through the pilot valve into the chamber 35a in the upper portion of the valve casing 35. This relieves the pressure on the upper side of the diaphragm valve 23 and the pressure of the incoming water in the valve inlet 20 will lift the body portion of the diaphragm valve 23 and flex its rim portion to the position of Fig. 4. In this position the water flowing from the inlet tube 10 through the inlet opening 20 will pass over the valve seat 21 and out through the openings 34 of the inner valve housing, whence it will flow upwardly around the inner valve housing and into the chamber 35a, and into the chamber 49 for filling the tank through pipe 36. At the same time, water will flow from the chamber 49 through the refill pipe 50 into the toilet bowl to increase the level in the bowl while the tank is filling.

When the water level in the tank has raised sufficiently to move the float rod 56 upwardly and raise the pilot valve to closed position the flow of water through the conical aperture 25 into the pressure chamber 26 will immediately increase the pressure on the upper side of the diaphragm valve 23, and since the upper surface of the valve is greater in area than its lower surface under pressure, the differential pressure on the upper side of the diaphragm valve will move it downwardly against the seat 21 and shut off the flow of the incoming water.

While this valve construction will operate satisfactorily with substantially no noise or vibration at ordinary low water pressures in the supply line, under higher pressures noise or vibration may occur unless the amount of water flowing through the valve is regulated so as to be substantially constant. The construction of float valve assemblies should be standard for use in all parts of the world under conditions where the water supply may vary from a few pounds up to over 150 pounds, and it is therefore desirable to embody automatic regulating means in the improved float valve assembly, for regulating the flow of water to the valve regardless of variations in supply pressure.

Preferably, the novel flow regulator 57 of the present invention is located in the inlet tube 10 leading to the float valve, and the tube 10 is preferably enlarged in diameter as aforesaid for satisfactorily enclosing the novel regulator.

The flow regulator element 57 is preferably made of rubber or rubber composition material so as to be resilient and distortable, and is solid in cross section as indicated in Fig. 3. The exterior of the element 57 has a spiral or helical rib 58 formed thereon throughout its length, which rib forms a continuous spiral or helical groove 59 extending from one end to the other of the regulator element 57.

The outer diameter of the regulator element 57 is such that when it is not under pressure or is subjected to relatively low water pressures passing through the inlet tube 10 from the supply pipe connected to the connector 12, a clearance as indicated at C is present between the outer surface of the helical rib 58 and the inner surface of the inlet tube 10. The resiliency of the regulator element 57 is such that at relatively low water pressures, say below 30 to 40 pounds per square inch, the regulator element will not be sufficiently compressed longitudinally to close up this clearance.

Accordingly, at such low pressures the regulator element 57 will be lifted off the tapered seat 60 at the bottom of inlet tube 10, but the clearance C will be maintained, as indicated in Fig. 1, because the water pressure does not materially compress the regulator, and therefore the water will flow upwardly through the space C between the rib 58 of the helix and the inner surface of the inlet tube 10. As shown, the upper end of the helical regulator 57 abuts a spider member which may consist of two plates 61 intersecting each other at right angles and secured together, and the upper edges of the plates abut the gasket 18 which rests on top of the inlet tube. Thus, water flowing past the helix 57 will then flow through the passages formed between the plates 61 to the opening 20 of the main diaphragm valve.

The lower end of the helical regulator 57 is preferably tapered as indicated at 62 for seating on the tapered seat 60 of the connector 12 to act as a check valve and shut off reverse flow through the connector, thus preventing siphoning of the water from the flush tank through the diaphragm valve in case the water supply should suddenly be cut off. Under such conditions, the diaphragm valve would normally tend to lift off its seat because of the vacuum being created above its upper surface, and water could then flow from the flush tank through the openings 34 and diaphragm valve and back through the inlet tube 10. With the flow regulator element 57 arranged to seat on the valve seat 60 at its lower end, the reverse flow through the water supply pipe is instantly cut off if the water pressure is cut off.

If the pressure of the water supply coming to the inlet tube 10 is materially increased above, say 30 pounds pressure, it would normally cause vibration or chattering or other noise in the diaphragm valve as it closes or opens. In the present improved construction, such increased pressures will compress the helical regulator 57 longitudinally and at the same time distort it slightly radially outward so as to take up the clearance C and engage the outer surface of rib 58 with the inner surface of tube 10. As the supply pressure increases, the longitudinal compression of the regulator 57 will reduce the cross sectional area of the groove 59 in proportion to the increase in pressure.

Obviously, as the helical regulator 57 is compressed longitudinally with its rib 58 in abutment with the tube 10, the pressure drop of the water flowing through the helical groove 59 builds up or progressively increases between the lower end and the upper end of the helix, so that the upper portion of the helix is compressed to a greater extent than the lower portion. Thus, if the pitch of the helix were constant from one end to the other, under high pressures, the cross sectional area of the groove 59 at the upper end would be much less than at the lower end.

In order to compensate for the greater compressive effect on the upper end of the helix, the pitch of the helical rib 58 and the helical groove 59 is progressively increased from the lower end of the helix to its top end, so that at higher pressures the cross sectional area of the helical groove 59 will approach uniformity from one end to the other.

As shown in Fig. 1, the pitch of the helical rib 58 normally and under low pressures increases from the lower portion of the helix to its upper portion, so that the vertical dimension of the helical groove 59 is much greater at the top end than it is at the bottom end. As a result, under high pressure the longitudinal compression of the helix 57 will produce a helical groove 59 which approaches uniformity in cross section from one end to the other as shown in Fig. 4, and the amount of water flowing to the diaphragm valve is thus regulated automatically to be substantially the same as it is with lower pressures, thus insuring the most quiet and efficient operation of the valve regardless of wide variations in supply pressure.

The pitch of the helix 57 may be varied so as to increase continuously at a uniform rate from its lower end to its upper end, or substantially the same effect can be obtained by varying the pitch in steps. That is to say, the bottom portion or lower one-third for example, may be at a certain pitch, the middle third at a greater pitch and the upper third at a still greater pitch. Such a construction may be more practical to manufacture than a continuously increasing pitch, and will obtain substantially the same results under varying supply pressures, for all practical purposes.

In the foregoing description, certain terms have been used for brevity, clearness and understanding, but no unnecessary limitations are to be implied therefrom beyond the requirements of the prior art, because such words are used for descriptive purposes herein and are intended to be broadly construed.

Moreover, the embodiment of the improved construction illustrated and described herein is by way of example, and the scope of the present invention is not limited to the exact details of construction.

Having now described the invention, the construction, the operation and use, and a preferred embodiment thereof, and the advantageous new and useful results obtained thereby; the new and useful constructions, and reasonable mechanical equivalents thereof obvious to those skilled in the art, are set forth in the appended claims.

I claim:

1. Flow regulator construction including a fluid supply tube, an abutment member in said tube, and a regulating device in said tube comprising a solid resilient member having one end engaging the abutment member and its periphery normally spaced inwardly of said tube and distortable under fluid pressure to engage said tube at its periphery, said resilient member having a helical peripheral groove for conducting fluid under increased pressure, said groove increasing in pitch from the inlet end to the outlet end of the tube.

2. Flow regulator construction including a liquid inlet tube, an abutment member in said tube, and a solid flow regulating element of rubber-like material in said tube and engaging said abutment member at one end, said element having a helical outer rib normally spaced inwardly of said tube and forming a helical channel in said element, said rib increasing progressively in pitch from the inlet to the outlet end, and said element being distortable by fluid pressure applied to its other end for forcing said rib into sealing abutment with said tube and for causing the pitch of the rib to approach uniformity from end to end.

3. Flow regulator construction including a fluid supply tube, a solid resilient flow regulating element in said tube having a helical outer rib normally spaced inwardly of said tube and forming a helical groove in said element, an abutment seat in the inlet end of said tube, the adjacent end of said element abutting said seat, an abutment member in the tube for the other end of said element, said helical outer rib normally increasing in pitch progressively from the inlet end to the outlet end, whereby increased fluid pressure applied to the inlet end of said element causes the pitch of the rib to approach uniformity and the element to become axially shortened and radially expanded to abut the rib with the tube.

RUTHERFORD H. HUNTER.

REFERENCES CITED

The following references are of record in the file of this patent:

UNITED STATES PATENTS

| Number | Name | Date |
| --- | --- | --- |
| 635,829 | Weston | Oct. 31, 1899 |
| 1,032,032 | Staunton | July 9, 1912 |
| 1,737,233 | Griffiths | Nov. 26, 1929 |
| 1,923,408 | Zerk | Aug. 22, 1933 |
| 1,933,852 | Hahn | Nov. 7, 1933 |
| 2,041,198 | McLean | May 19, 1936 |
| 2,188,366 | Lindstaedt | Jan. 30, 1940 |
| 2,228,552 | Arbogast | Jan. 14, 1941 |
| 2,318,236 | Layton | May 4, 1943 |
| 2,506,152 | Hunter | May 2, 1950 |
| 2,588,555 | Molloy | Mar. 11, 1952 |

FOREIGN PATENTS

| Number | Country | Date |
| --- | --- | --- |
| 594,783 | Germany | of 1934 |